US006833832B2

(12) United States Patent
Wolverton

(10) Patent No.: US 6,833,832 B2
(45) Date of Patent: Dec. 21, 2004

(54) LOCAL BIT-PLANE MEMORY FOR SPATIAL LIGHT MODULATOR

(75) Inventor: Gary S. Wolverton, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 308 days.

(21) Appl. No.: 10/039,392

(22) Filed: Dec. 31, 2001

(65) Prior Publication Data

US 2002/0085438 A1 Jul. 4, 2002

Related U.S. Application Data

(60) Provisional application No. 60/258,938, filed on Dec. 29, 2000.

(51) Int. Cl.[7] ................................................ G09G 5/39
(52) U.S. Cl. ......................... 345/532; 345/519; 345/98
(58) Field of Search ................................ 345/536–537, 345/519, 530, 545, 531, 532, 693, 213, 84, 690–692, 87, 98, 557; 348/743, 514, 520

(56) References Cited

U.S. PATENT DOCUMENTS

| 5,079,544 | A | | 1/1992 | DeMond et al. | |
|---|---|---|---|---|---|
| 5,365,283 | A | * | 11/1994 | Doherty et al. | 348/743 |
| 5,452,024 | A | | 9/1995 | Sampsell | |
| 5,526,051 | A | | 6/1996 | Gove et al. | |
| 5,969,710 | A | * | 10/1999 | Doherty et al. | 345/693 |
| 6,388,661 | B1 | * | 5/2002 | Richards | 345/693 |
| 6,525,720 | B1 | * | 2/2003 | Baek | 345/213 |

* cited by examiner

Primary Examiner—Kee M. Tung
(74) Attorney, Agent, or Firm—Charles A. Brill; Wade James Brady, III; Frederick J. Telecky, Jr.

(57) ABSTRACT

A controller (15) for a display system (10) that uses a spatial light modulator (15) to display data formatted in bit-planes. The controller (15) receives at least some of the bit-plane data from a frame memory. It has local memory that buffers data transfer and stores data for bit-planes having multiple accesses, thereby increasing the bandwidth of data transfers from the frame memory (14) to the SLM (16).

20 Claims, 1 Drawing Sheet

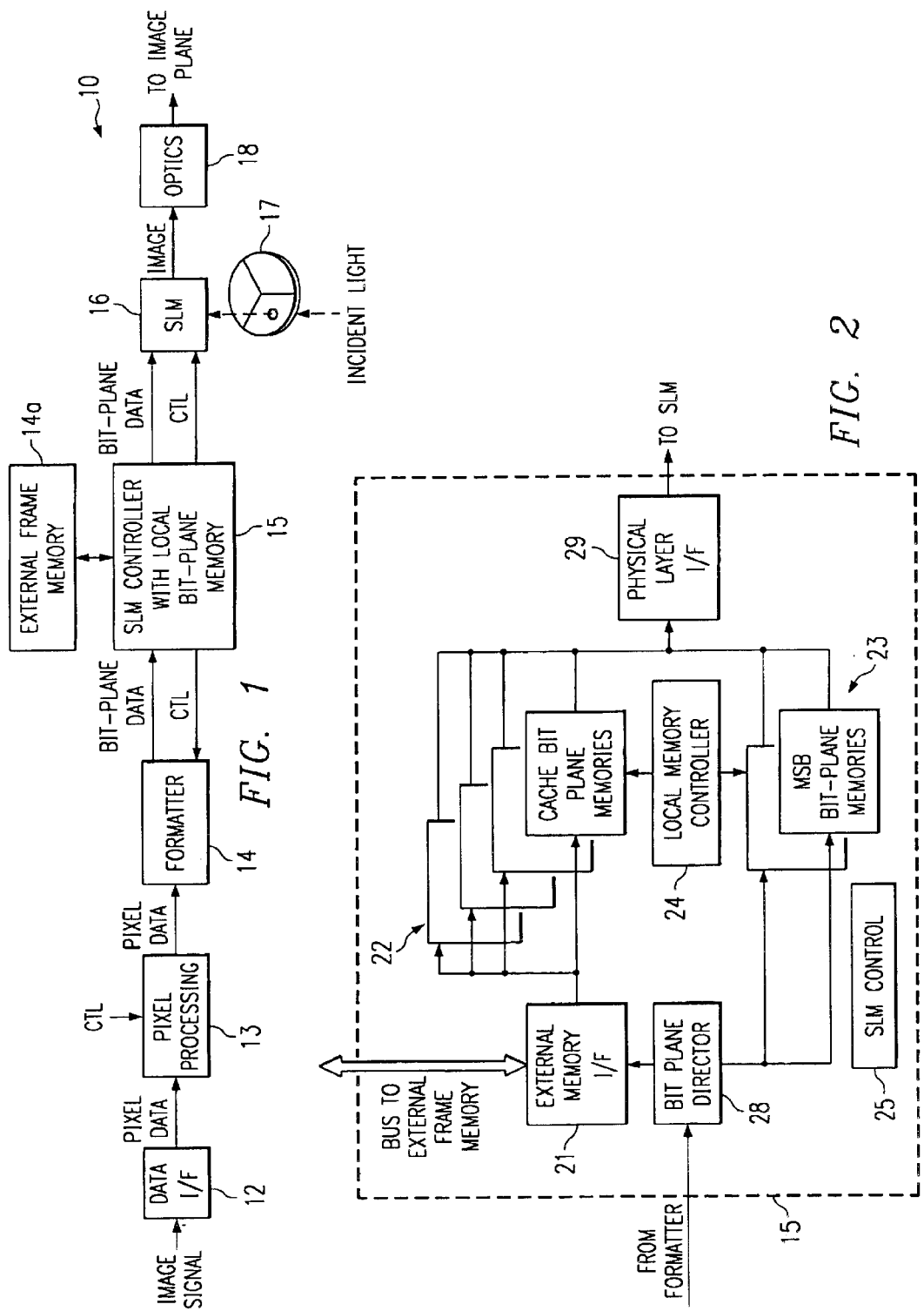

LOCAL BIT-PLANE MEMORY FOR SPATIAL LIGHT MODULATOR

This application claims priority under 35 USC §119(e)(1) of provisional application No. 60/258,938 filed Dec. 29, 2000.

TECHNICAL FIELD OF THE INVENTION

The present invention relates generally to display systems that use spatial light modulators, and more particularly, to storing data for delivery to the spatial light modulator.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems.

Digital micro-mirror devices (DMDs) are a type of SLM, and may be used for projection display applications. The images provided by a DMD compare favorably with those provided by CRTs and can be projected to a screen in dimensions surpassing today's large screen televisions.

A DMD has an array of micro-mechanical display elements, each having a tiny mirror that is individually addressable by an electronic signal. Depending on the state of its addressing signal, each mirror tilts so that it either does or does not reflect light to the image plane, thereby modulating light incident on the DMD. The mirrors may be generally referred to as "display elements", which correspond to the pixels of the image that they generate. Generally, displaying pixel data is accomplished by loading memory cells connected to the display elements. Each memory cell receives one bit of data representing an on or off state of the display. The display elements can maintain their on or off state for controlled display times.

Other SLMs operate on similar principles, with an array of display elements that may emit or reflect light simultaneously, such that a complete image is generated by addressing display elements rather than by scanning a screen. Another example of an SLM is a liquid crystal display (LCD) having individually driven display elements.

For all types of SLMs, motion displays are achieved by updating the data in the SLM's memory cells at sufficiently fast rates. To achieve intermediate levels of illumination, between white (on) and black (off), pulse-width modulation (PWM) techniques are used. The basic PWM scheme involves first determining the rate at which images are to be presented to the viewer. This establishes a frame rate and a corresponding frame period. For example, if images are displayed 60 frames per second, each frame lasts for approximately 16.7 milliseconds. Then, the intensity resolution for each pixel is established. In a simple example, and assuming n bits of resolution, the frame time is divided into $2^n-1$ equal time slices. For a 16.7 millisecond frame period and n-bit intensity values, the time slice is $16.7/(2^n-1)$ milliseconds.

Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the PWM example described in the preceding paragraphs, during a frame, each bit-plane is separately loaded and the display elements are addressed according to their associated bit-plane values. For example, the bit-plane representing the LSBs of each pixel is displayed for 1 time slice, whereas the bit-plane representing the MSBs is displayed for 2 n/2 time slices.

The task of providing data to the SLM is further complicated by efforts to achieve the best picture quality. To this end, various "bit-splitting" sequences have been devised. These sequences distribute within the frame period, the longer display times associated with the more significant bits. For example, rather than turning the MSB on or off for a contiguous block of time, its time is divided and interspersed among the display times of other bits. As a simple example, the MSB time could be divided in half, with one half being displayed at the beginning of the frame, followed by the display times of some of the other bits, with the rest of the MSB time at mid-frame, followed by the display times of the remaining bits.

SUMMARY OF THE INVENTION

One aspect of the invention is a controller for a spatial light modulator (SLM) that receives pixel data formatted into bit-plane data. The controller determines which bit-planes are sent to external memory and which bit-planes are sent to an "MSB" local memory. Typically, the bit-planes stored in the "MSB" local memory are sent to the SLM more often. This greatly reduces the bandwidth requirements of the external memory interface. The controller will then manage receiving the data from both the external frame memory and the "MSB" local memory for display on the SLM. This will typically be accomplished with additional local memory so that maximum burst rates can be achieved. A physical layer interface provides for the transfer of data from this local memory to the SLM at high data transfer rates. The rest of the controller comprises various hardware for controlling the operation of the SLM.

An advantage of the invention is that it reduces the bandwidth required for data transfers from external frame memory to the SLM. It is a solution to the task of transferring data that achieves a low system cost and meets acceptable load times for the SLM.

BRIEF DESCRIPTION OF THE DRAWINGS

FIG. 1 is a block diagram of an SLM-based display system, which has local memory in accordance with the invention.

FIG. 2 is a block diagram of the SLM controller of FIG. 1.

DETAILED DESCRIPTION OF THE INVENTION

FIG. 1 is a block diagram of a projection display system 10, which uses a spatial light modulator (SLM) 16 to generate images from an input signal representing image data. Only those components significant to pixel data processing are shown. Other components, such as might be used for a user interface or for audio processing, are not shown.

For purposes of this description, system 10 has a DMD-type SLM 16. Comprehensive descriptions of DMD-based digital display systems, without features of the present invention, are set out in U.S. Pat. No. 5,079,544, entitled "Standard Independent Digitized Video System", in U.S. patent Ser. No. 08/147,249, entitled "Digital Television System", and in U.S. Pat. No. 5,452,024, entitled "DMD Display System." Each of these patents and patent applications is assigned to Texas Instruments Incorporated, and each is incorporated by reference herein. System 10 could also be used with other types of SLMs that have operating characteristics similar to DMDs, notably, the use of bit-plane data.

System 10 is capable of receiving input signals from a variety of sources. An input data interface 12 receives the input signal, and is designed according to the type(s) of input signal. The tasks performed by interface 12 may include separation of image data from other data in the input signal, and of converting analog signals to digital data.

Pixel processing unit 13 prepares the image data for display, by performing various data processing tasks. Processing unit 13 may include whatever processing memory is useful for such tasks, such as field and line buffers. The tasks performed by processing unit 12 may include decompression of data, scan conversion of television type signals, scaling, and other picture quality enhancement tasks.

Formatter 14 receives processed pixel data from pixel processing unit 13. It has associated circuitry for formatting the data into "bit-plane" format, and delivers the bit-planes to SLM 16. As discussed in the Background, the bit-plane format permits each display element of SLM 16 to be turned on or off in response to the value of 1 bit of data at a time. System 10 being a color wheel system, the bit-planes for each color are delivered during one third of the total frame time.

The bit-plane data from the formatter 14 is delivered to SLM controller 15. The SLM controller 15 then routes the bit-plane data to either the external memory via the external memory interface or to the local bit-plane memory (MSB). Typically, the data communications between frame memory 14a and SLM controller 15 is via a read/write arbitrated type bus. SLM controller 15 provides various system control functions for operation of SLM 16. In addition to implementing these control functions, controller 15 also has internal bit-plane memory in accordance with the invention. Typically, all bit-plane data passes through this internal memory before being transferred to SLM 16. However, in other embodiments, bit-plane data that is not stored in local memory may pass directly from frame memory 14 to SLM 16.

The transfer of bit-plane data from internal memory of controller 15 to SLM 16 is typically by means of an I/O type point-to-point connection. As compared to the read/write operations associated with frame memory 14, the transfer of data from internal memory of controller 15 to SLM 16 involves only reads. The I/O connection permits the data to be transferred at much higher bandwidths, as compared to data transferred via the bus interface from frame memory 14. Examples of suitable physical layer interfaces are TTL, single and double data rates, and LVDS (low voltage differential signaling) interfaces.

Details of a suitable SLM 16 are set out in U.S. Pat. No. 4,956,619, entitled "Spatial Light Modulator", which is assigned to Texas Instruments Incorporated and incorporated by reference herein. Essentially, SLM 16 uses the data from the format and frame buffer unit 15 to address each display element of its display element array. The "on" or "off" state of each display element forms an image. The data for different colors (red, green, and blue) is sequentially used to display three images through the color wheel 17. The eye adds the colors displayed (or not displayed) for each pixel and perceives the desired colors.

Display optics unit 18 has optical components for illuminating SLM 16 and for projecting the image from SLM 16.

In other embodiments, system 10 may have three SLMs instead of a single SLM 16, and no color wheel. The three SLMs would each concurrently generate an image of a different color—red, green, and blue—with the images combined for a full color display.

Local Bit-Plane Memory

FIG. 2 illustrates the SLM controller 15 of FIG. 1 in further detail. Controller 15 is typically implemented in an ASIC (application specific integrated circuit) having has embedded bit-plane memory 22 and 23.

External memory interface 21 handles transfer of bit-plane data from frame buffer 14 to and from the controller 15. As stated above, this transfer is typically by means of a memory bus. In this manner controller 15, handles reading from and writing to frame buffer 14. Typically, frame buffer 14 has two buffers, one for writes and one for reads, in which case, controller 15 also handles a memory swap every frame.

Controller 15 has two local memories: a cache memory 22 and a MSB memory 23. These memories are "local" to SLM 16 in the sense that their data may be transferred to SLM 16 using a non-bus point-to-point read rather than by using the bus from frame memory 14. Both local memories may be implemented as embedded DRAM. As explained below, these internal memories reduce the bandwidth demands of the bus transfers out of frame memory 14.

Cache memory 22 operates to spread out accesses to frame buffer 14. It acts essentially as a buffer so that transfer of data to SLM 16 is maintained at a more constant rate rather than in bursts. The result is a reduction in the peak bandwidth of data transfers to SLM 16.

The bit-planes stored in the MSB memory 23 are typically the most significant bits which are the bits that are the most frequently accessed. The MSB's stored in memory 23 may be only the MSB, or may also include other more significant bits. If desired, double buffering of bit-planes for successive frames can be implemented.

Typically, controller 15 will operate so as to send some bit-planes to frame memory 14a and some to the MSB memory 23. A bit-plane director 28 determines which bit-planes are sent to which type of memory. Cache memory 22 is used to manage and optimize the interaction between the two data paths of bit-plane data from frame memory 14 or MSB memory 22 to the SLM 16.

As stated in the Background, once the pixel data destined for SLM 16 is formatted into bit-planes, it is read to the SLM 16 in "bit-split" sequences. This means that the display time of the MSB and usually those of some of the other more significant bits are divided up so that they are interspersed with the display times of less significant bits. An example of such a "bit-splitting" sequence is one in which bit 7 (the MSB) is split 12 times, bits 6, 5, and 4 are each split 6 times, bit 2 is split 2 times, and bits 1 and 0 are not split.

Each time a bit is split, another write to SM 16 (and therefore read from memory) is required. Thus, the example of the preceding paragraph results in a total of 37 memory reads, with the MSB being 30% of the reads. If the sequence is repeated for each color, a complete frame of data requires 111 reads. However, by storing the MSB bit-plane in MSB memory 23, the accesses are reduced. For a color wheel system in which accesses are on the basis of more than three color wheel segments, the effect on accesses can be calculated on that basis.

In general, the use of local memories 22 and 23 reduces bandwidth requirements for transfers from frame memory 14a in two ways. First, it permits storing of bit-planes for one or more of the more significant bits in MSB memory 23. Second, it keeps the data flow steady by caching data in cache memory 22.

The size required for the local memory is determined by the pixel resolution of the SLM. For example, for XGA resolution of 1024×768 pixels, each bit-plane requires 768,432 bits. For more enhanced resolutions, such as SXGA, which is 1280×1024 pixels, each bit-plane requires 1,310,720 bits. In general, a rough approximation is 1 Mbits per bit-plane.

As stated above, physical layer interface 29 provides a high bandwidth connection to SLM 16. Examples of suitable interfaces are those complying with TTL or LVDS standards, which are for short haul high speed connections such as the hardwired connection between controller 15 and SLM 16.

Although FIG. 2 illustrates both types of local memories 22 and 23, either one could be used independently of the other. In the case of using only MSB memory 23, it is not necessary that the bit-plane data for the non MSB's go through controller 15; a transfer directly from frame memory 14 to SLM 16, or a transfer through some other interface, might be possible.

Local memory controller 24 controls the timing and sequencing of data transfers to SLM 16. SLM control unit 25 contains various hardware circuits and logic to control the operation of the SLM 16. Its structure and operation can be understood by reference to the SLM patents referenced above.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A controller for a spatial light modulator (SLM) that receives pixel data formatted into bit-plane data, comprising:
    an external memory interface for sending and receiving the bit-plane data;
    an MSB local memory for storing bit-plane data for at least the most significant bit, before delivery to the SLM;
    a bit-plane director for determining which bit-planes are sent to external memory and which are sent to the MSB local memories;
    a local memory controller for controlling the operation of the MSB local memory;
    a physical layer interface for providing the transfer of data from the local memory to the SLM; and
    an SLM control unit for controlling the operation of the SLM.

2. The controller of claim 1, wherein the local memory is DRAM memory.

3. The controller of claim 1, wherein all elements are fabricated as a single integrated circuit.

4. The controller of claim 1, further comprising a cache local memory for buffering transfer of bit-planes from the external memory.

5. The controller of claim 1, wherein the physical layer interface is a TTL interface.

6. The controller of claim 1, wherein the physical layer interface is a LVDS interface.

7. The controller of claim 1, wherein the external memory receives the bit-plane data via a bus.

8. The controller of claim 1, wherein the external memory is DRAM memory.

9. A method of transferring bit-plane data from frame memory to a spatial light modulator, comprising the steps of:
    storing the bit-plane data in the frame memory;
    reading the bit-plane data representing one or more of the more significant bits from the frame memory to a local memory having a point-to-point read connection to the SLM;
    transferring the bit-plane data from the local memory to the SLM via the point-to-point read connection; and
    repeating the transferring step for each occurrence of the bit-plane during a frame period.

10. The method of claim 9, wherein the reading is performed by reading bit-plane data representing all bits to the local memory.

11. The method of claim 9, wherein the transferring step is performed according to a TTL physical layer interface.

12. The method of claim 9, wherein the transferring step is performed according to a LVDS physical layer interface.

13. The method of claim 9, wherein the reading step is performed by communicating the data over a bus.

14. A spatial light modulator (SLM) display system, comprising:
    a data interface for receiving image data;
    a pixel processing unit for processing the image data into pixel data;
    a frame memory for storing the image data formatted as bit-plane data;
    a controller for receiving the bit-plane data from the frame memory and for controlling the SLM, the controller having the following elements: an external memory interface for receiving the bit-plane data; an MSB local memory for storing bit-plane data for at least the most significant bit, immediately before delivery to the SLM; a bit-plane director for determining which bit-planes are delivered to the frame memory and which are delivered to the MSB local memory; a local memory controller for controlling the operation of the MSB local memory, wherein the local memory is connected to the SLM via a point-to-point data read connection; a physical layer interface for providing the transfer of data from the local memory to the SLM; and an SLM control unit for controlling the operation of the SLM;
    a spatial light modulator for generating the displays; and
    optics for projecting the displays to an image plane.

15. The display system of claim 14, wherein the spatial light modulator is a digital micro mirror device.

16. The system of claim 14, wherein the local memory is DRAM memory.

17. The system of claim 14, wherein all elements are fabricated as a single integrated circuit.

18. The system of claim 14, further comprising a cache local memory for buffering transfer of all bit-planes not stored in the MSB local memory.

19. The system of claim 14, wherein the physical layer interface is a TTL interface.

20. The system of claim 14, wherein the physical layer interface is a LVDS interface.

* * * * *